(12) United States Patent
Izumi

(10) Patent No.: US 6,184,959 B1
(45) Date of Patent: Feb. 6, 2001

(54) LIQUID CRYSTAL DISPLAY DEVICE HAVING ALIGNMENT FILM THAT PROVIDES ALIGNMENT UPON IRRADIATION AND MANUFACTURING METHOD THE SAME

(75) Inventor: Yoshihiro Izumi, Kashihara (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/165,615

(22) Filed: Oct. 2, 1998

(30) Foreign Application Priority Data

Oct. 24, 1997 (JP) .................................... 9-292109

(51) Int. Cl.$^7$ ................................ G02F 1/1337
(52) U.S. Cl. ............................ 349/124; 349/156
(58) Field of Search ...................... 349/124, 123, 349/156, 157

(56) References Cited

U.S. PATENT DOCUMENTS

| 5,389,698 | * | 2/1995 | Chigrinov .................... 522/2 |
| 5,815,232 | * | 1/1999 | Miyazaki et al. ............ 349/155 |
| 5,859,682 | * | 1/1999 | Kim et al. .................. 349/124 |
| 5,889,571 | * | 3/1999 | Kim et al. .................. 349/124 |
| 5,936,691 | * | 8/1999 | Kumar et al. ............... 349/124 |
| 5,952,676 | * | 9/1999 | Sato et al. .................. 349/156 |

FOREIGN PATENT DOCUMENTS

| 61-173221 | 8/1986 | (JP) . |
| 1-134336 | 5/1989 | (JP) . |
| 2-223922 | 9/1990 | (JP) . |
| 4-28086 | 7/1992 | (JP) . |
| 6-175133 | 6/1994 | (JP) . |
| 8-122769 | 5/1996 | (JP) . |
| 8-184849 | 7/1996 | (JP) . |
| 96-15022 | 5/1996 | (KR) . |

OTHER PUBLICATIONS

Yamamoto et al, "Liquid–crystal alignment by slantwise irradiation of non–polarized UV light on a polyimide layer", SID 96 digest, May 1996.*

Kim et al, Photo–alignment of liquid crystals using a new photopolymer, SID 96 digest, May 1996.*

Lee et al, Mechanism of UV modification of LC pretilt angle and its application to two–domain TN–LCDs, May 1996.*

* cited by examiner

Primary Examiner—Kenneth Parker
(74) Attorney, Agent, or Firm—Dike, Bronstein, Roberts & Cushman, LLP; David G. Conlin; George W. Neuner

(57) ABSTRACT

A liquid crystal display device of the present invention includes a liquid crystal; a pair of substrates facing each other so that the liquid crystal is sandwitched therebetween and an electric field for displaying is applied to the liquid crystal; spacers fixably provided between the pair of substrates; and an alignment film material provided on at least one of the pair of substrates so as to contact the liquid crystal, the alignment film material showing aligning property upon irradiation of light. As a result, a liquid crystal display device having an excellent displaying quality is provided in which a cell gap is uniform, no contamination and impairment of an alignment film occur, and alignment nonuniformity by rubbing is not generated, even when a screen is made larger.

18 Claims, 14 Drawing Sheets

FIG. 3

①APPLY ALIGNMENT FILM MATERIAL ON A PAIR OF ELECTRODE SUBSTRATES

②APPLY SPACER MATERIAL ON AT LEAST ONE OF THE SUBSTRATES

③PATTERN SPACER MATERIAL BY PHOTOLITHOGRAPHY

④ALIGNING PROCESS BY PHOTO-ALIGNING METHOD

⑤COMBINE THE PAIR OF SUBSTRATES AND INJECT LIQUID CRYSTAL

LIQUID CRYSTAL DISPLAY DEVICE HAVING ALIGNMENT FILM THAT PROVIDES ALIGNMENT UPON IRRADIATION AND MANUFACTURING METHOD THE SAME

FIELD OF THE INVENTION

The present invention relates to a liquid crystal display device for use as a display device in AV (Audio-Visual) equipment and OA (Office Automation) equipment.

BACKGROUND OF THE INVENTION

A common liquid crystal display device has a structure wherein a pair of glass substrates having electrodes are faced each other, and the two glass substrates are bonded and fixed to each other on the periphery by a seal material leaving a liquid crystal injection opening, and a liquid crystal is sandwitched therebetween, and the liquid crystal injection opening is sealed by a sealant. In order to maintain a uniform distance between the two substrates, plastic beads, etc., having a uniform particle diameter are dispersed as spacers between the substrates.

As the displaying system of the liquid crystal display device, for example, TN (Twisted Nematic) mode, STN (Super Twisted Nematic) mode, GH (Guest Host) mode, ECB (Electrically Controlled Birefringence) mode, FLC (Ferroelectric Liquid Crystal) mode, and other systems are available.

As the driving system of the liquid crystal display device, simple-matrix driving system or active-matrix driving system is adopted. A liquid crystal display device of simple-matrix type has a structure wherein a first substrate having Y electrodes which have been patterned in a band shape in a horizontal (Y) direction and a second substrate having X electrodes which have been patterned in a band shape in a vertical (X) direction are positioned facing each other so that the Y electrodes and the X electrodes are substantially orthogonal to each other, and a liquid crystal is sandwitched between the two substrates. When color displaying, a color filter of R, G, and B is provided on one of the substrates.

A liquid crystal display device of active-matrix type has a structure wherein a liquid crystal is sandwitched between (a) an active-matrix substrate provided with an active element such as thin film transistors (TFTs) of a semiconductive layer of amorphous silicon (a-Si), pixel electrodes and signal electrodes connected to the TFTs, and gate electrodes and (b) a counter substrate having counter electrodes facing the active-matrix substrate. When color displaying, a color filter of R, G, and B is provided on the counter substrate. Note that, since details of such common conventional liquid crystal display devices are described in *Liquid Crystal Device Handbook* (published by The Nikkan Kogyo Shimbun Ltd.), *Liquid crystal display technology* (published by Sangyo Tosho Ltd.), and other publications, detailed explanations thereof are omitted here.

Meanwhile, as we shift into the information age, a demand for finer and larger screen in display devices used for, for example, a television in AV equipment and a monitor in OA equipment has not been higher, and in order to meet such a demand, development and practical application of larger screen has been under way in various display devices such as CRT display, liquid crystal display device (LCD), plasma display, EL display, and LED display.

Because an increase in weight, dimensions, and power consumption are expected as a result of increasing the screen size, lighter, thinner, and less power consuming display devices are also in demand. The liquid crystal display device, compared with other display devices, has such an advantage that the dimension of the depth (thickness) can be made significantly thinner and therefore is light weight, allowing the device to fit in a small space with ease, and the power consumption is low, thus meeting the above requirement. Further, since a full-color image can be obtained with ease, the liquid crystal display device is suitable for large screen display devices such as a large monitor and a wall display device, and expectations are high in realizing a larger screen more than for other display devices.

For example, Japanese Unexamined Utility Model No. 191029/1985 (Jitsukaisho 60-191029) and Japanese Unexamined Patent publication No. 184849/1996 (Tokukaihei 8-184849) disclose a liquid crystal display device in which a large screen is realized in a structure wherein one of a pair of substrates constituting the liquid crystal display device is composed of a plurality of small substrates which are connected to one another. Also, Japanese Unexamined Patent publication No. 122769/1996 (Tokukaihei 8-122769) discloses a liquid crystal display device in which a large screen is realized by connecting a plurality of liquid crystal panels without noticeable seams.

However, in the conventional liquid crystal display devices such as above, because the spacers for maintaining a uniform distance between a pair of substrates are provided by being dispersed over the substrates by a dispersing method of dry type or wet type, it is technically difficult to maintain a constant density of the spacers with respect to the entire surface of the display area, and the density variance causes nonuniform cell gap d (spacing between a pair of substrates).

Also, because the spacers are merely dispersed over the substrates instead of bonded and fixed thereto, in the event where an external pressure is applied on the liquid crystal panel, the spacers are moved and this creates variance in spacer density, and as a result the cell gap d is changed.

Because the coloring of display by liquid crystal is closely related to the thickness of the liquid crystal layer, a change in cell gap d in a display area causes nonuniform displaying and the display quality is lowered. Particularly, as the screen size of the liquid crystal display device is increased in response to the recent demand for larger screen, the liquid crystal display device becomes more susceptible to the effect of bowing and oscillation caused by the dead weight of the glass substrates constituting the liquid crystal panel, namely, the liquid crystal display device becomes more susceptible to the adverse effect of external pressure, and nonuniformity in cell gap d is more likely to be generated. As a result, the display quality is further deteriorated.

As means to solve such problems, a method for forming the spacers by photolithography technique is disclosed, for example, in Japanese Unexamined Patent publication No. 173221/1986 (Tokukaisho 61-173221) and Japanese Unexamined Patent publication No. 223922/1990 (Tokukaihei 2-223922). In this method, specifically, after subjecting an alignment film to aligning process, photosensitive polyimide or photoresist is applied and exposed through a mask, and spacers of polyimide are fixably provided except on an effective pixel region.

However, in this method, photosensitive polyimide or photoresist (spacer material) is directly applied on an alignment film which has been subjected to aligning process by rubbing method. Therefore, it is required to carry out an etching process, etc., after exposure to remove unnecessary portions using a solvent.

The solvent used here swells a high polymer film (alignment film) and frees a part of molecular structure that has an aligning effect. Therefore, it is unavoidable that the liquid crystal aligning ability in a uniform direction, as given by rubbing, based on intermolecular effect is lowered. Namely, by the solvent, the aligned state of the alignment film material of the liquid crystal is contaminated and impaired severely, and the alignment of the liquid crystal injected into the liquid crystal panel becomes nonuniform.

Meanwhile, Japanese Unexamined Patent publication No. 175133/1994 (Tokukaihei 6-175133) discloses a method in which photosensitive polyimide or photoresist is applied onto an alignment film material which has not been subjected to aligning process, and spacers of polyimide are formed except on the effective pixel region by exposure and etching through a mask, and then the alignment film material exposed is subjected to aligning process by rubbing method, thereby preventing contamination and impairment of the aligned state caused by the solvent and the etching process. However, because the aligning process by rubbing is carried out after forming the spacers in the form of pillars, there is a case where alignment nonuniformity is generated, originating from each spacer pillar. This is caused by a slight difference in the rubbing state between the periphery of each spacer and the other portions in the rubbing process as induced by differences in various conditions such as the height and shape of the spacers formed on the substrate, the rubbing direction, the diameter, rotation speed, and rotation direction of a rubbing roll, the material, length, and implant density of rubbing cloth hair, and the transport speed of the substrate. For this reason, it had been required to limit the positioning of the spacer pillars so that the alignment nonuniformity originating from the spacers does not affect the display pixel area.

SUMMARY OF THE INVENTION

The present invention offers a solution to the above-mentioned problems, and accordingly it is an object of the present invention to provide a liquid crystal display device having an excellent displaying quality in which a cell gap is uniform, no contamination and impairment of an alignment film occur, and alignment nonuniformity by rubbing is not generated, even when a screen is made larger, and to provide a manufacturing method of such a liquid crystal display device.

In order to achieve the above-mentioned object, a liquid crystal display device in accordance with the present invention includes: a liquid crystal; a pair of substrates facing each other so that the liquid crystal is sandwitched therebetween and an electric field for displaying is applied to the liquid crystal; spacers fixably provided between the pair of substrates; and an alignment film material provided on at least one of the pair of substrates so as to contact the liquid crystal, the alignment film material showing aligning property upon irradiation of light.

In this arrangement, the liquid crystal is sandwiched between a pair of substrates facing each other, and the spacers are fixably provided between the pair of substrates. The spacers are formed, for example, by photolithography technique, allowing the spacers to be provided between the pair of substrates at arbitrary positions with arbitrary density.

As a result, the spacers are distributed uniformly between the pair of substrates, thus making the liquid crystal cell gap uniform between the pair of substrates when the liquid crystal is injected between the substrates.

Also, since the spacers are fixably provided between the pair of substrates, the spacers are prevented from moving therebetween by the effect of external pressure.

Further, in the described arrangement, since the alignment film material shows an aligning property upon irradiation of light, it is possible to carry out an aligning process by irradiation of light, instead of a process by the conventional rubbing method, as a process of the alignment film material for aligning liquid crystal molecules. Because the aligning process by irradiation of light allows the aligning process to be carried out without contacting the alignment film material, the aligning process can be carried out uniformly with ease even on a substrate formed with the spacers and thus having a bumpy surface.

Therefore, in the described arrangement, unlike the conventional rubbing method, the alignment nonuniformity originating from the spacers does not generate. Also, because a spacer material can be patterned before aligning process, unlike the conventional example, the alignment film after aligning process is not contaminated by a solvent, etc., and therefore the liquid crystal aligning ability is not lowered.

In order to achieve the afore-mentioned object, a manufacturing method of a liquid crystal display device in accordance with the present invention includes the steps of: applying an alignment film material on at least one of a pair of substrates for sandwitching a liquid crystal; applying a spacer material on at least one of the pair of substrates; patterning the spacer material; and subjecting the alignment film material applied to an aligning process by photo-aligning method.

With this method, because the aligning process can be carried out by the photo-aligning method without contacting the alignment film material, it is possible to carry out the aligning process uniformly with ease even on a substrate formed with the spacers and thus having a bumpy surface. Therefore, unlike the conventional rubbing method, the alignment nonuniformity originating from the spacers does not generate. Also, because the spacer material can be patterned before aligning process, the alignment film after aligning process is not contaminated by a solvent, etc., used in patterning, and unlike the conventional example, the liquid crystal aligning ability is not lowered. Further, because the alignment film material can be applied before or after the patterning of the spacer material, the order of the manufacturing steps can be set flexibly as required.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a flowchart explaining steps of forming an alignment film and spacers on a substrate of the liquid crystal display device of First Embodiment.

DESCRIPTION OF THE EMBODIMENTS

The following will describe one embodiment of the present invention referring to attached drawings.

First Embodiment

Figure 1:
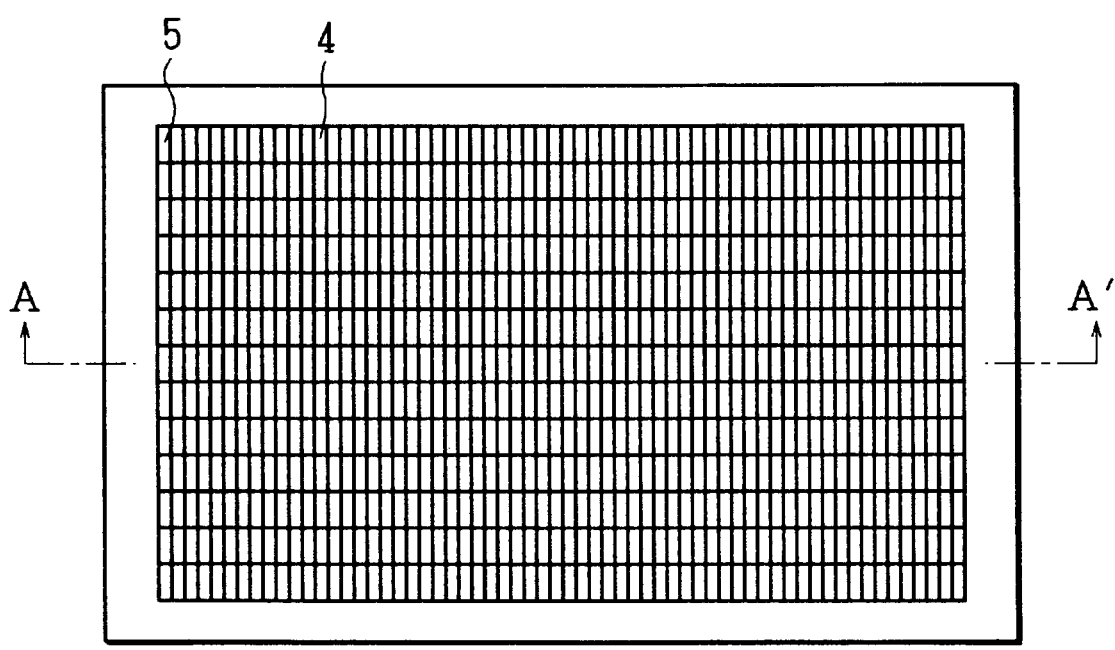
FIG. 1 is a plan view of a liquid crystal display device in accordance with First Embodiment of the present invention.
Figure 2:
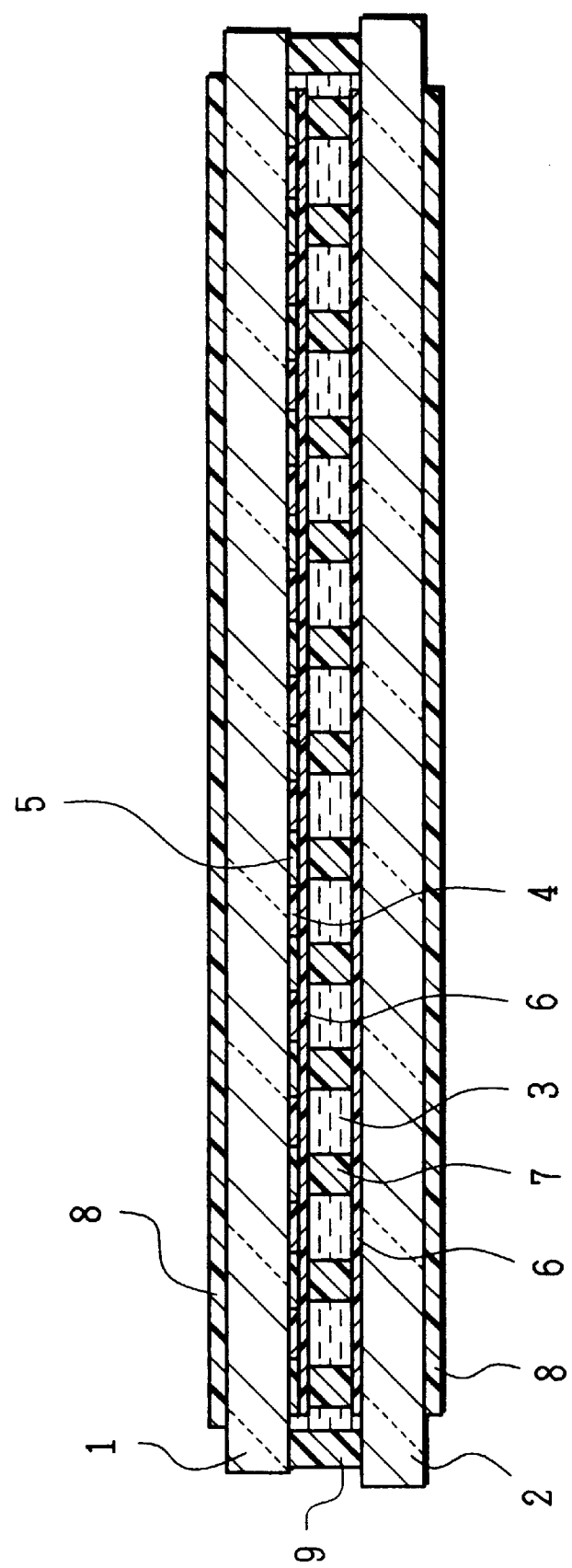
FIG. 2 is a cross sectional view of the liquid crystal display device of FIG. 1 taken along a line A–A'.

FIG. 1 is a plan view of one example of a liquid crystal display device of the present invention. FIG. 2 is a cross sectional view of the liquid crystal display device of FIG. 1 taken along a line A–A'. As shown in FIG. 2, a liquid crystal display device of the present embodiment is a liquid crystal display device of active-matrix type in which a liquid crystal 3 is enclosed in a spacing between a pair of substrates, namely, between (i) a color filter substrate (referred to as CF substrate hereinafter) 1 provided with a color filter 4 and (ii) a TFT substrate 2 on which TFTs (Thin Film Transistors) are provided as an active element.

On the TFT substrate 2, there are provided a TFT element which is formed by semiconductor film working process, an insulating film, matrix electrodes, and pixel electrodes, etc. (all not shown).

On the CF substrate 1, there are provided the color filter 4 of R (Red), G (Green), and B (blue), a black matrix (referred to as BM hereinafter) 5, and common electrodes (not shown), etc.

On at least one of the CF substrate 1 and the TFT substrate 2, there are provided an alignment film 6 and spacers 7, which are made from a material and in the steps described later. Also, on each outer surface of the CF substrate 1 and the TFT substrate 2, a polarizing plate 8 is provided. In FIG. 1 and FIG. 2, a backlight and driving circuits which are required for the display device are omitted.

Note that, except for the arrangement of an alignment film material 6a and the spacers 7, the liquid crystal display device of the present embodiment has the same structure as that of a common liquid crystal display device of active-matrix type, and since details of such a common liquid crystal display device are described in *Liquid Crystal Device Handbook* (published by The Nikkan Kogyo Shimbun Ltd.), *Liquid Crystal Display Technology* (published by Sangyo Tosho Ltd.), and other publications, explanations thereof are omitted here.

Figure 4:
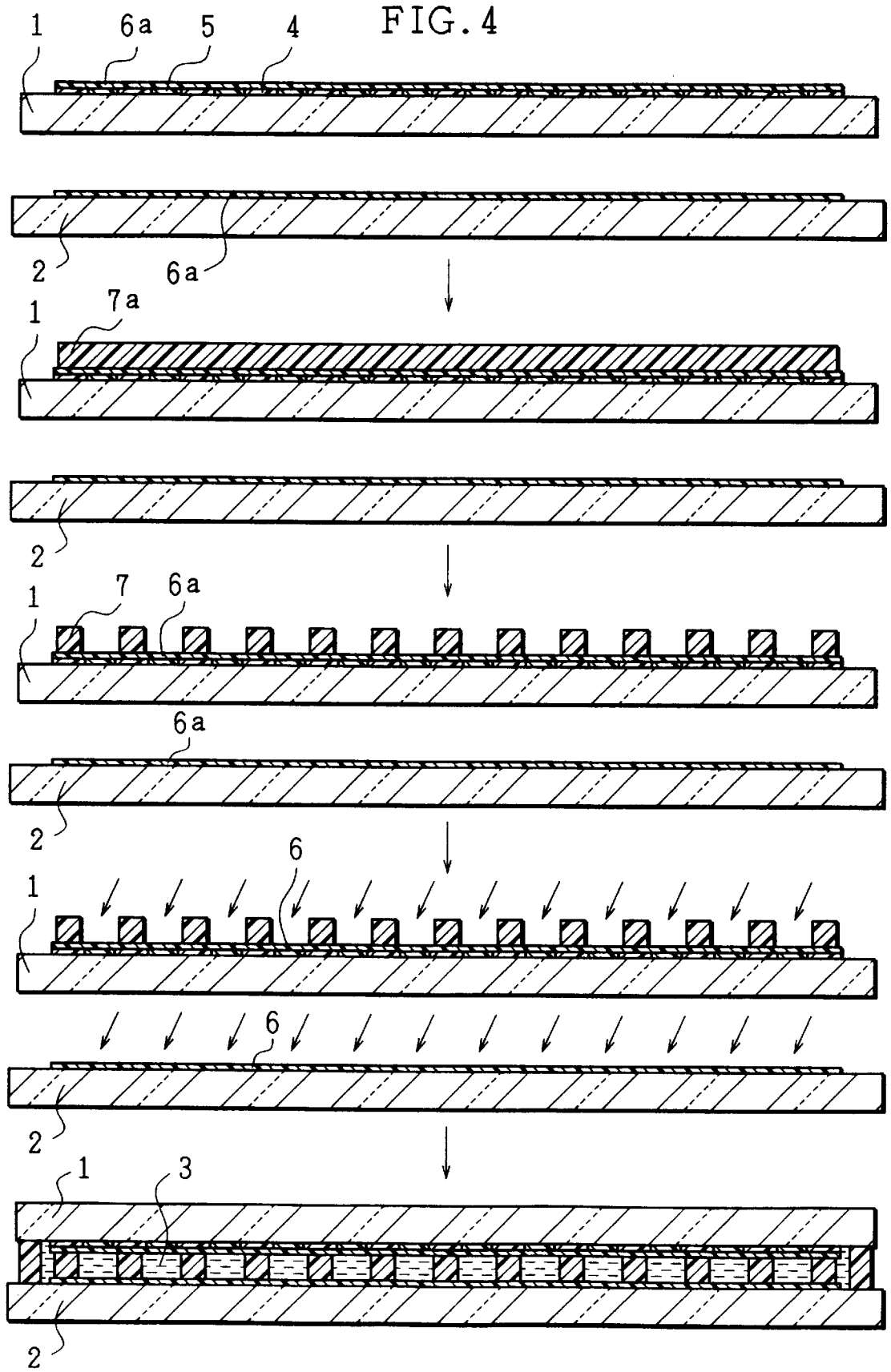
FIG. 4 is a drawing showing the steps of forming an alignment film and spacers on a substrate of the liquid crystal display device of First Embodiment.

The following describes the alignment film 6 and the spacers 7 used in the liquid crystal display device of the present invention. FIG. 3 is a flowchart explaining the steps of forming the alignment film 6 and the spacers 7 on the substrates, and FIG. 4 is a drawing showing the steps of forming the alignment film 6 and the spacers 7 on the substrates.

First, on each of the CF substrate 1 and the TFT substrate 2 which have been provided with electrodes, active element, and color filter, etc., by conventional techniques, the alignment film material 6a is applied and formed by a printing method or spinner method. Specifically, as a material of the alignment film material 6a, polyimide is used, and after applying polyimide in a thickness of 0.05 $\mu$m to 0.15 $\mu$m, baking is carried out at a temperature of 180° C. to 250° C. for substantially an hour. The alignment film material 6a has such a property that the liquid crystal contacting the alignment film material 6a is aligned upon irradiation of light such as linearly polarized light.

Then, on at least one of the CF substrate 1 and the TFT substrate 2 on which the alignment film material 6a has been applied, for example, on the CF substrate 1 in the present embodiment, a spacer material 7a is applied. As the spacer material 7a, photosensitive resist is used, the resist being applied in a thickness of 4 $\mu$m to 5 $\mu$m by the printing method, spinner method, or other methods, and prebaking is carried out on a hot plate at 90° C. for substantially 5 minutes.

Then, after exposing the spacer material 7a via a photomask by UV light having a wavelength of 365 nm with an intensity of substantially 200 mJ/cm$^2$, the spacer material 7a is developed using a developer so as to pattern the spacer material 7a. As the developer, considering the contamination of the alignment film material 6a by alkali ions, it is preferable to adopt an organic alkali developer.

Figure 5:
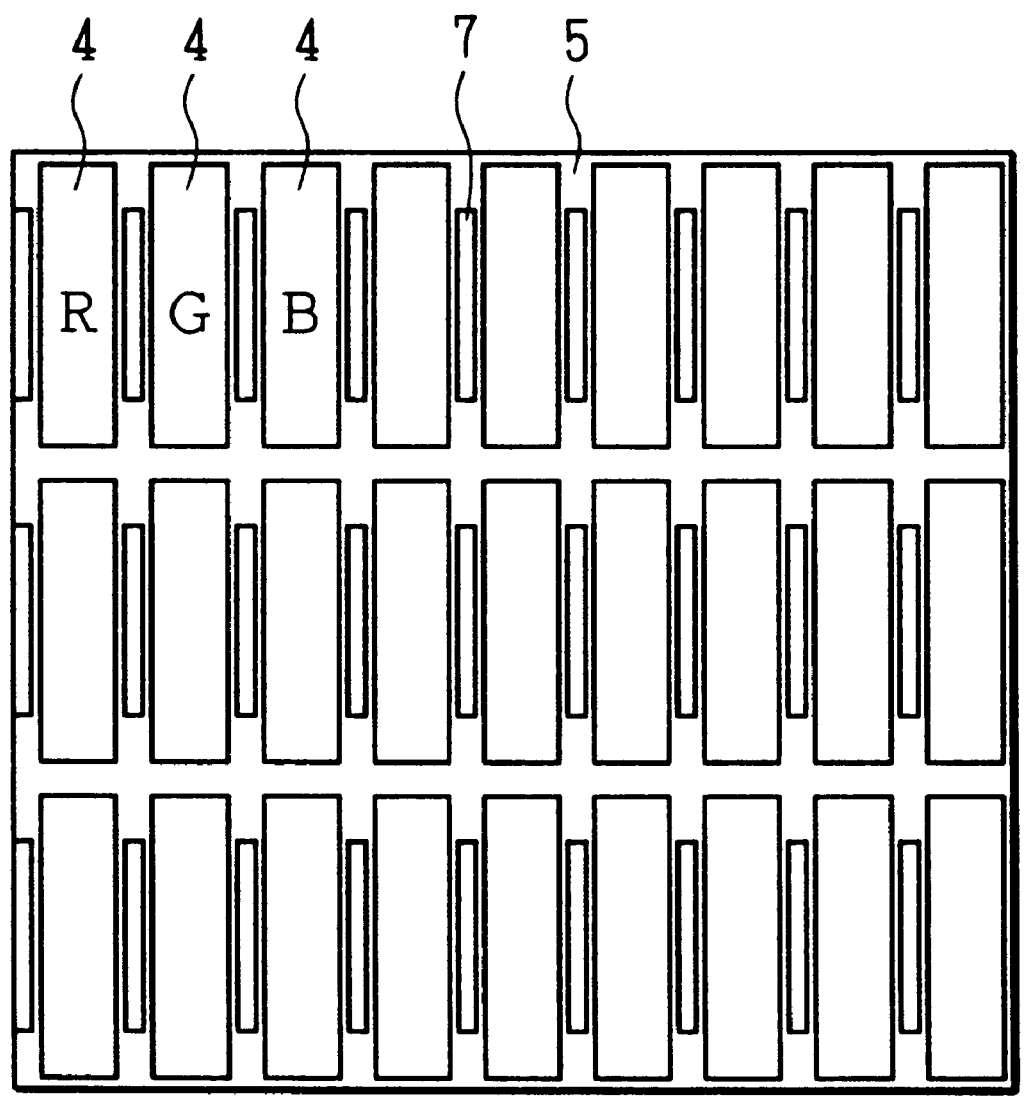
FIG. 5 is a plan view showing one example of how the spacers of the liquid crystal display device of First Embodiment are patterned.

FIG. 5 is a drawing showing one example of how the spacers 7 are patterned. Here, the spacers 7 are provided within the region of the BM 5. Namely, the spacers 7 are formed in the form of islands or in stripes on a region other than the effective pixel region. The CF substrate 1 provided with the spacers 7 is washed thoroughly with pure water to remove the developer after development, and the CF substrate 1 provided with the spacers 7 is dried. Here, postbaking may be carried out as required at a temperature of 180° C. for substantially an hour.

Then, the alignment film material 6a on the CF substrate 1 and the TFT substrate 2 is irradiated with linearly polarized UV light having a wavelength of 254 nm with an intensity of substantially 1 J/cm$^2$ to 2 J/cm$^2$ using a Xe lamp. Here, by setting the incident angle (with respect to the normal to the surfaces of the CF substrate 1 and the TFT substrate 2) of the UV light at 70° to 80°, the alignment anchoring force for aligning the liquid crystal molecules with a pre-tilt angle of substantially 1° is obtained in the alignment film material 6a of the CF substrate 1 and the TFT substrate 2.

Figure 6:
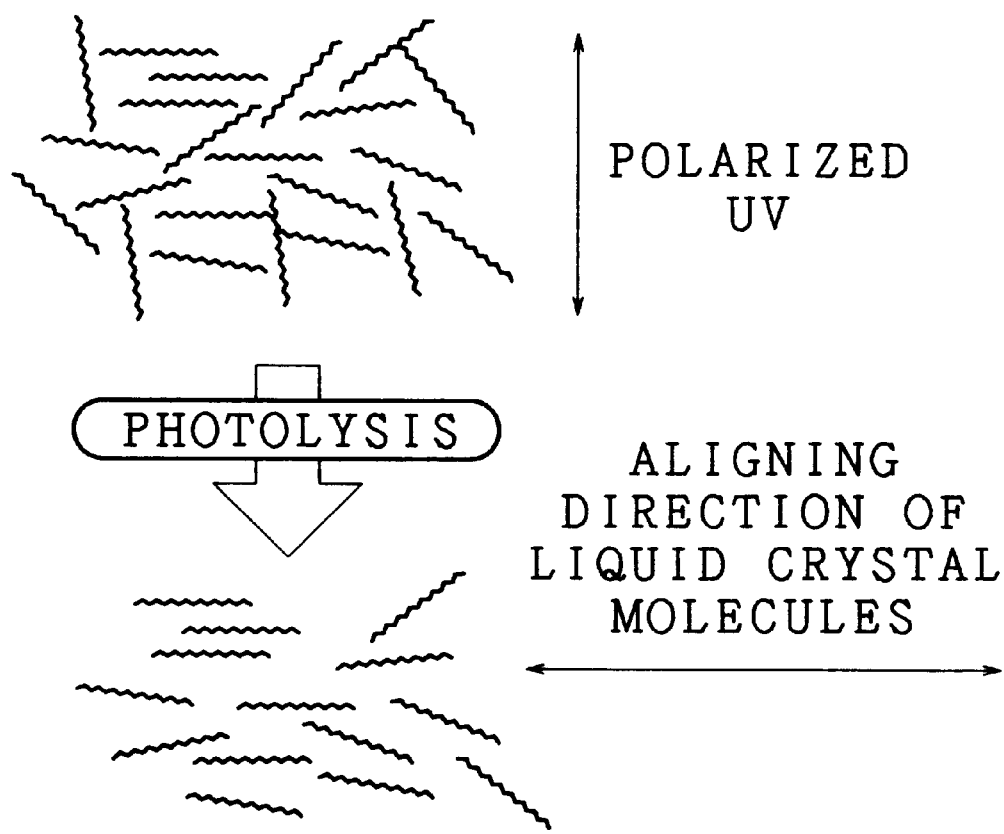
FIG. 6 is an explanatory drawing showing a mechanism of photolysis of polyimide used as a material of an alignment film material.

It is widely known that, as shown in FIG. 6, in the molecular structure of polyimide, polyimide chains are randomly aligned prior to irradiation of UV light but upon irradiation of polarized UV light, the polyimide chains directing in the same direction as the polarization direction of the UV light are broken, and this gives the alignment film material 6a the alignment anchoring force for aligning the liquid crystal molecules. Since methods of giving the alignment anchoring force to polyimide by irradiation of light are disclosed, for example, in "Society Information Display 96

DIGEST. p 654 (1996)", "Society Information Display 96 DIGEST. p 642 (1996)", "O plus E. No. 207. p 81 (1997)", and other publications, detailed explanations thereof are omitted here.

Then, (i) the CF substrate 1 provided with the alignment film 6 and the spacers 7 and (ii) the TFT substrate 2 provided with the alignment film 6 are combined with each other by a seal 9 provided so as to surround the periphery of the liquid crystal display device, and a liquid crystal is injected between the CF substrate 1 and the TFT substrate 2, thus completing the liquid crystal display device.

Note that, in the steps of FIG. 4, the spacer material 7a is patterned (exposed and developed) while the alignment film material 6a and the spacer material 7a are in the deposited state. The alignment film material 6a and the spacer material 7a used here are both made of a material which is reactive to light (UV light). This raises the concern that the alignment film material 6a on the under layer is adversely affected by the irradiation of UV light for exposing the spacer material 7a on the upper layer.

However, in the present embodiment, because (I) the alignment film material 6a and the spacer material 7a have different sensitivity wavelengths, 365 nm and 254 nm, respectively and (II) the amount of exposure required are different, substantially 200 mJ/cm$^2$ and substantially 1 J/cm$^2$ to 2 J/cm$^2$, respectively, it was found that the alignment film material 6a on the under layer is not affected by the irradiation of light when exposing the spacer material 7a on the upper layer. Namely, the sensitivity wavelength $\lambda 1$ of the spacer material 7a on the upper layer and the sensitivity wavelength $\lambda 2$ of the alignment film material 6a on the under layer are set so that the relationship of $\lambda 1 \neq \lambda 2$ is satisfied, or alternatively, the exposure amount P1 required for patterning of the spacer material 7a on the upper layer and the exposure amount P2 required for aligning process of the alignment film material 6a are set so that the relationship of P1<P2, or more preferably the relationship of 2×P1<P2 is satisfied.

In the liquid crystal display device as manufactured in the described manner, since the spacers 7 are formed, for example, by the photolithography technique, the spacers 7 can be placed on arbitrary positions with arbitrary density. Thus, even when the liquid crystal display device is made larger, a uniform liquid crystal cell gap W is realized when the liquid crystal 3 is injected. Also, since the spacers 7 are fixed on at least one of the CF substrate 1 and the TFT substrate 2, the spacers 7 are not moved by the effect of external pressure.

Further, since the alignment film material 6a for aligning the liquid crystal molecules is aligned by irradiation of light, in the liquid crystal display device of the present embodiment, as a process of the alignment film material 6a, aligning process by irradiation of light can be carried out instead of the process by the conventional rubbing method. Because the aligning process by irradiation of light allows the aligning process to be carried out without contacting the alignment film material 6a, the aligning process can be carried out uniformly with ease even on a substrate formed with the spacers 7 and thus having a bumpy surface.

Therefore, unlike the conventional rubbing method, alignment nonuniformity originating from the spacers 7 is not generated. Also, as described above, since the spacer material 7a can be patterned before aligning process, unlike the conventional example, the alignment film after aligning process is not contaminated by a solvent, etc., and therefore the liquid crystal aligning ability is not lowered.

Note that, the material of the alignment film material 6a used in the present invention is not limited to the polyimide material, and it is possible to adopt PVCi (Polyvinyl Cinnamate) film as disclosed in a publication such as "Society Information Display 95 DIGEST. p. 877 (1995)".

Figure 7:
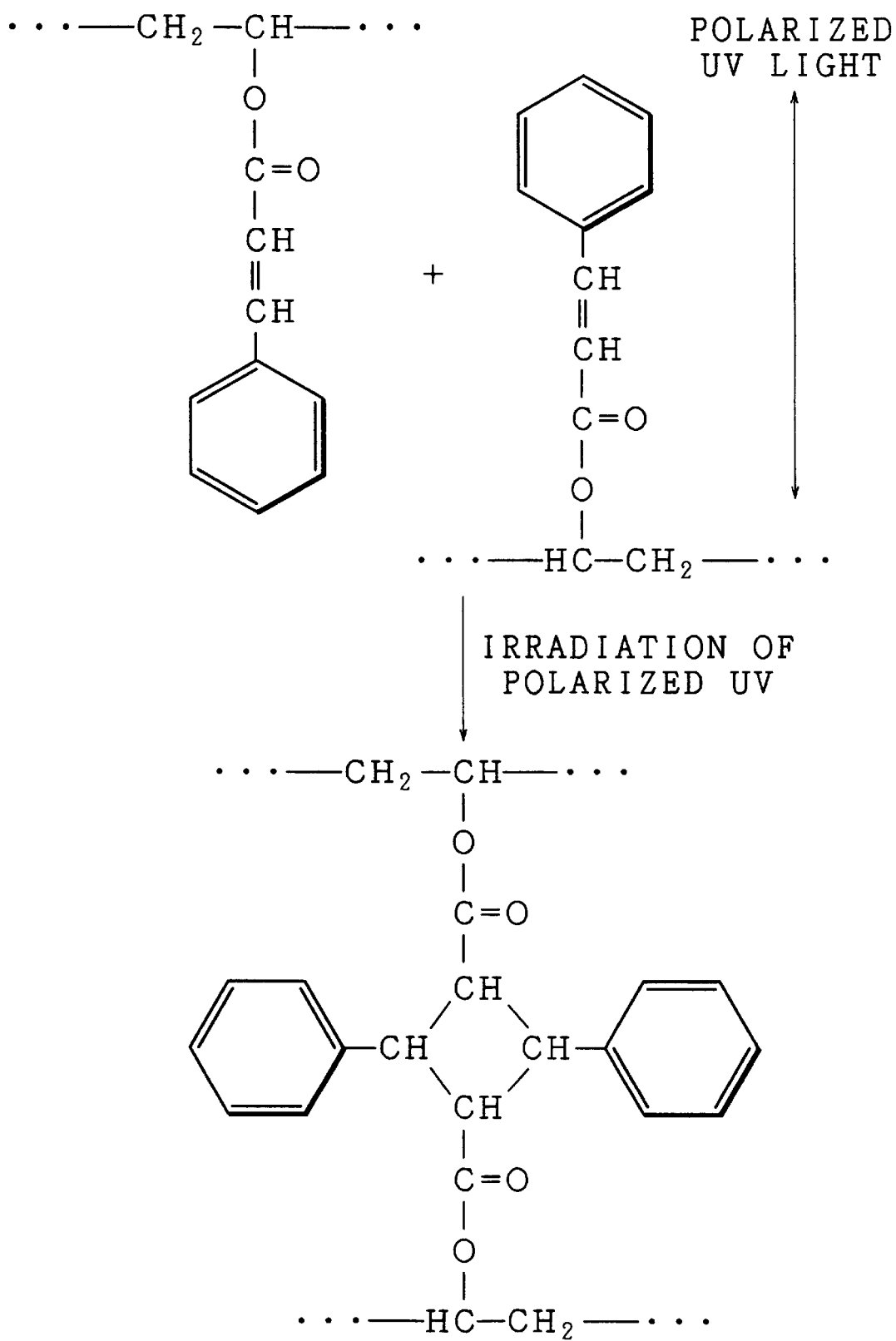
FIG. 7 is an explanatory drawing showing a photodimerization reaction of a PVCi film used as another material of the alignment film material.

As shown in FIG. 7, when the PVCi film is irradiated with polarized UV light, in the PVCi molecules, only the molecules of side chains parallel to the polarization direction of the radiation light undergo photodimerization reaction, and unreacted side chains remain in a direction perpendicular to the polarization direction of the radiation light, and an axis having a large refractive index appears in the direction the unreacted side chains are remaining.

Generally, it is known that the liquid crystal molecules align themselves in a direction of the axis of the alignment film material 6a having optical anisotropy with a large refractive index, and it is speculated that the liquid crystal molecules on the PVCi film are also aligned in a direction perpendicular to the polarization direction of the radiation light, corresponding to the axis having a large refractive index.

Namely, as the alignment film material 6a used in the present invention, the following films (1) and (2) are available, which are known to exhibit excellent aligning property upon irradiation of light. (1) An organic film, such as polyimide film, in which anisotropic photolysis of the polymer main chain is induced in a direction parallel to the polarization plane upon irradiation of linearly polarized light and (2) a photo-crosslinkable organic film, such as PVCi film, in which the polymer side chains parallel to the polarization plane are selectively crosslinked upon irradiation of linearly polarized light. When the liquid crystal display device was manufactured by following the described steps using these films (1) and (2), it was confirmed that the effects of the present invention were exhibited sufficiently. Note that, other than the above-mentioned films, as long as the aligning property is exhibited by irradiation of light, a variety of materials may be adopted as the alignment film material 6a.

Also, when a material which exhibits aligning property upon irradiation of light in the described manner is adopted as the alignment film material 6a, by dividing the pixels and projecting light from a different direction for each divided pixel using a photomask, it is possible to align the liquid crystal molecules with ease in such a manner that the viewing angle is different for each divided pixel. Thus, when TN mode is adopted as the liquid crystal display mode, the viewing angle dependency can be compensated for one another among divided pixels, and wider viewing angle is realized with ease. Therefore, this technique is effective in widening the viewing angle when making the screen of the liquid crystal display device larger.

Also, in the described steps, when combining the TFT substrate 2 and the CF substrate 1 provided with spacers, it is a common method to combine the two substrates with each other by the seal 9 provided so as to surround the periphery of the liquid crystal display device, and the liquid crystal 3 is injected between the substrates thereafter.

However, it is possible alternatively to completely bond the two substrates with each other by the spacers 7. In such a case, for example, when thermosetting resin or thermoplastic resin is adopted as the spacers 7, or a method such as transferring a thin adhesive onto the tip of the spacers 7 is adopted, the TFT substrate 2 and the CF substrate 1 only need to be combined with each other by a heat-press machine. Note that, in the case of adopting thermosetting resin as the spacers 7, it is required to optimize the two temperatures of the pre-bake temperature of when applying the resin and the post-bake temperature after development at temperatures below the thermosetting temperature.

In this manner, when the spacers 7 are fixed to both the TFT substrate 2 and the CF substrate 1, the cell gap is fixed completely, and as a result the spacers 7 are not moved by the effect of external pressure, and waviness on a liquid crystal panel composed of the CF substrate 1 and the TFT substrate 2 is not generated. This is extremely effective in improving the display quality while realizing a large screen in the liquid crystal display device.

Also, when combining the CF substrate 1 and the TFT substrate 2 with each other by the seal 9 provided so as to surround the periphery of the liquid crystal display device, generally, as the seal 9, a thermosetting epoxy adhesive or thermosetting acryl adhesive is adopted. In such a case, the seal 9 is patterned by the screen printing method or the dispenser drawing method so as to surround the periphery of the liquid crystal display device.

On the other hand, in the case of adopting the spacer material 7a capable of adhering to both the TFT substrate 2 and the CF substrate 1, the spacer material 7a functions as the seal 9. Namely, when patterning the spacer material 7a, the pattern surrounding the periphery of the liquid crystal display device is integrally formed simultaneously. This omits the conventionally required step of forming the seal pattern.

Second Embodiment

Figure 8:
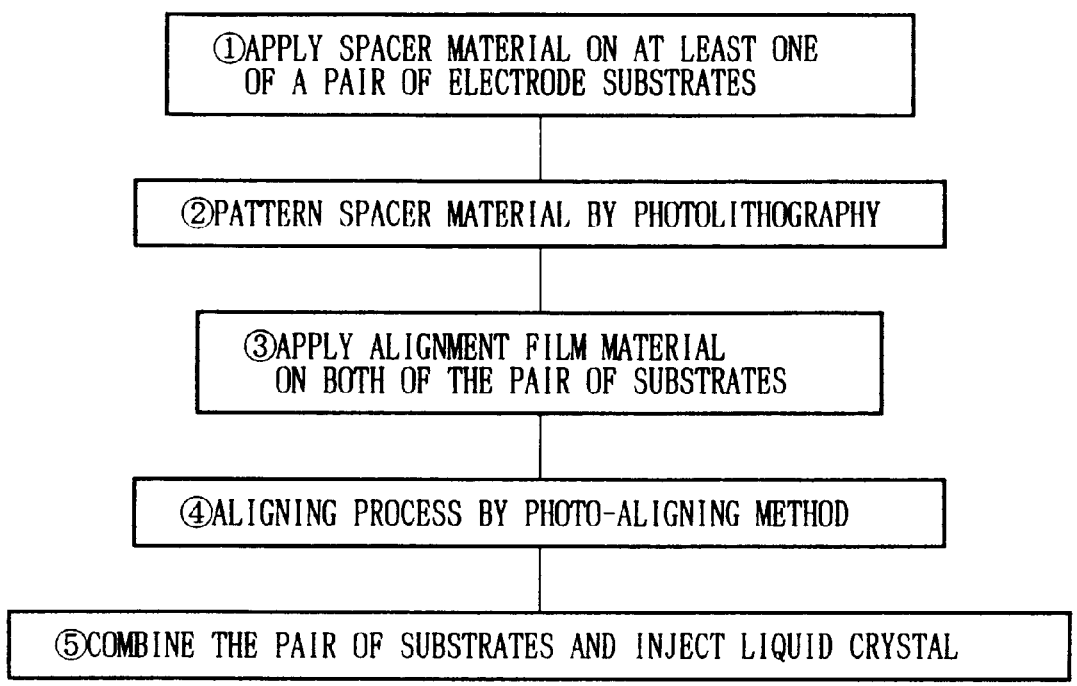
FIG. 8 is a flowchart explaining steps of forming an alignment film and spacers on a substrate of a liquid crystal display device of Second Embodiment in accordance with the present invention.
Figure 9:
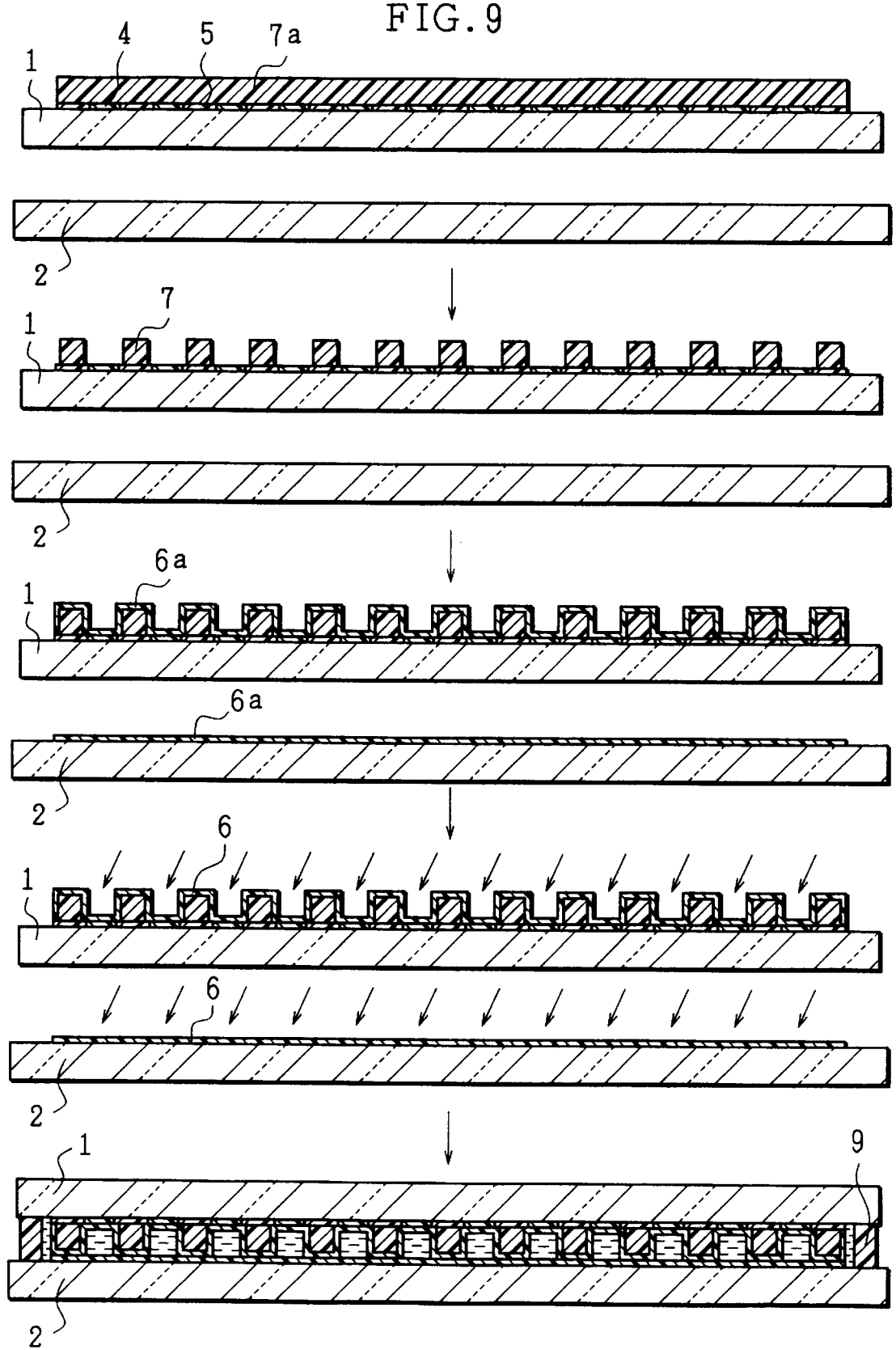
FIG. 9 is a drawing showing the steps of forming an alignment film and spacers on a substrate of the liquid crystal display device of Second Embodiment.

The following will describe Second Embodiment of the present invention. Note that, members having the same functions as the members appeared in First Embodiment are given the same reference numerals and explanations thereof are omitted here. In Second Embodiment, unlike First Embodiment, the alignment film material is formed after forming the spacers 7. FIG. 8 is a flowchart explaining the steps of forming the spacers 7 and the alignment film 6 on the substrates, and FIG. 9 is a drawing showing the steps of forming the spacers 7 and the alignment film 6 on the substrates.

On at least one of the TFT substrate 2 and the CF substrate 1 which have been provided with electrodes, active element, and the color filter 4, etc., by known techniques, for example, on the CF substrate 1 in the present embodiment, the spacer material 7a is applied. As the spacer material 7a, a photosensitive resist is used, and the resist is applied in a thickness of 4 Am to 5 $\mu$m by the printing method, spinner method, or other methods, and pre-baking is carried out on a hot plate at 90° C. for substantially 5 minutes.

Then, after exposing the spacer material 7a by UV light having a wavelength of 365 nm with an intensity of substantially 200 mJ/cm$^2$ via a photomask, the spacer material 7a is developed using a developer and is patterned so as to form the spacers 7. FIG. 5 is a drawing showing one example of how the spacers 7 are patterned. Here, the spacers 7 are formed in the form of islands or in stripes within the region of the BM 5. After developing the spacers 7, the CF substrate 1 provided with the spacers 7 is washed thoroughly with pure water to remove the developer after development, and the CF substrate 1 is dried. Here, post-baking may be carried out as required at 180° C. for substantially an hour.

Then, the alignment film material 6a is applied and formed on the surfaces of the TFT substrate 2 and the CF substrate 1 provided with the spacers 7 by the printing method, spinner method, spraying method, or other methods. As the alignment film material 6a, a polyimide solution is used, the solution being applied in a thickness of 0.05 $\mu$m to 0.15 $\mu$m, and baking is carried out at a temperature of 180° C. to 250° C. for substantially an hour.

Depending on the size and the density of the spacers 7 formed in the previous step, there is a case where the alignment film material 6a cannot be applied uniformly by the printing method or spinner method due to the bumps of the spacers 7. In such a case, the alignment film material 6a is applied by the spraying method. This allows the alignment film material 6a to be uniformly applied even when, for example, bumps of the spacers 7 are present.

Then, each alignment film material 6a of the CF substrate 1 and the TFT substrate 2 is irradiated with linearly polarized UV light having a wavelength of 254 nm with an intensity of substantially 1 J/cm$^2$. Here, by setting the incident angle (with respect to the normal direction) of the UV light at 70° to 80°, the alignment anchoring force for aligning the liquid crystal molecules with a pre-tilt angle of substantially 0.80 is obtained.

Then, (i) the TFT substrate 2 provided with the alignment film 6 and (ii) the CF substrate 1 provided with the alignment film 6 and the spacers 7 are combined with each other by the seal 9 provided so as to surround the periphery of the liquid crystal display device, and the liquid crystal 3 is injected between the CF substrate 1 and the TFT substrate 2, thus completing the liquid crystal display device of the present invention.

With the liquid crystal display device of Second Embodiment, the same effect as obtained in First Embodiment is obtained.

Third Embodiment

Figure 10:
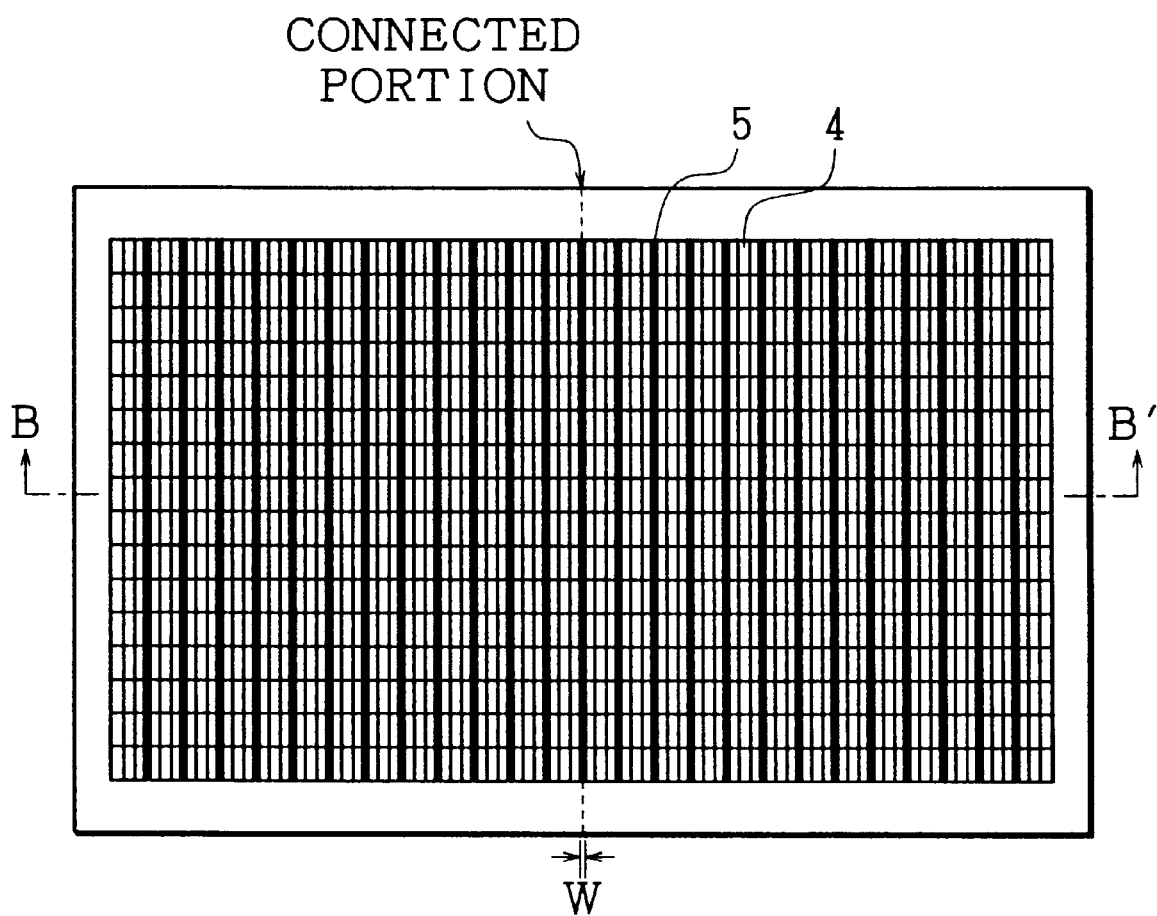
FIG. 10 is a plan view of a liquid crystal display device in accordance with Third Embodiment of the present invention.
Figure 11:
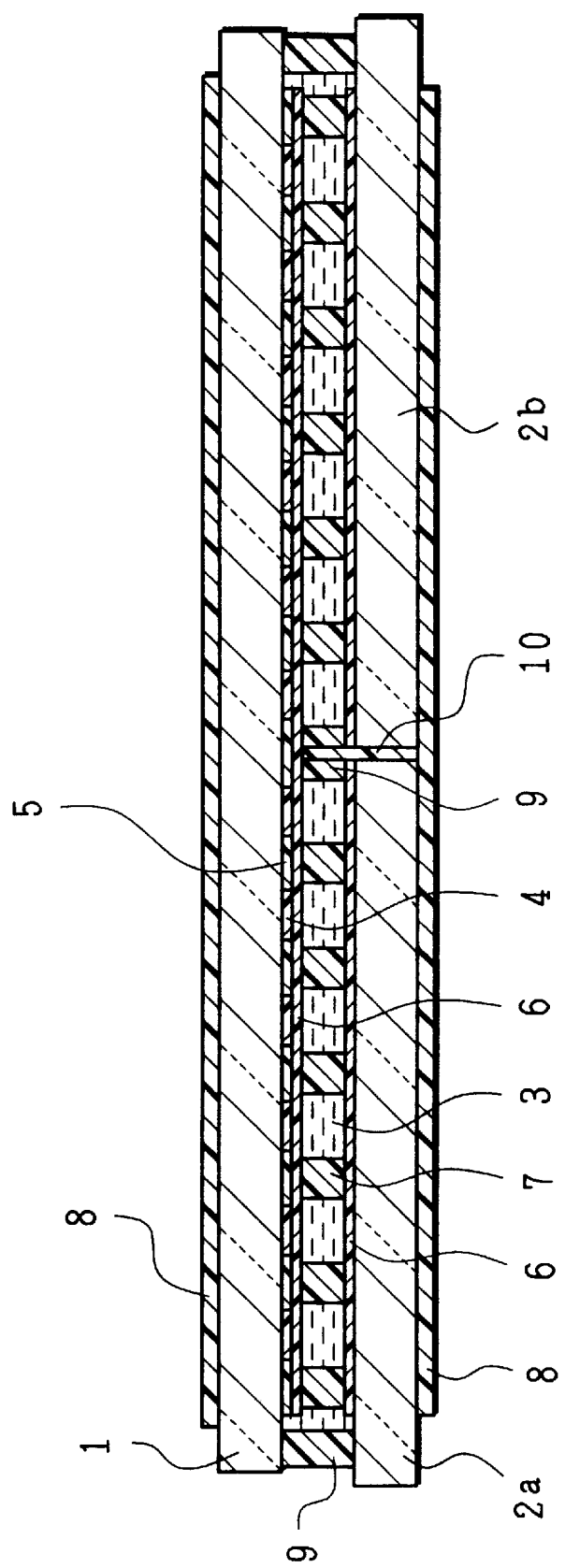
FIG. 11 is a cross sectional view of the liquid crystal display device of FIG. 10 taken along a line B–B'.
Figure 12:
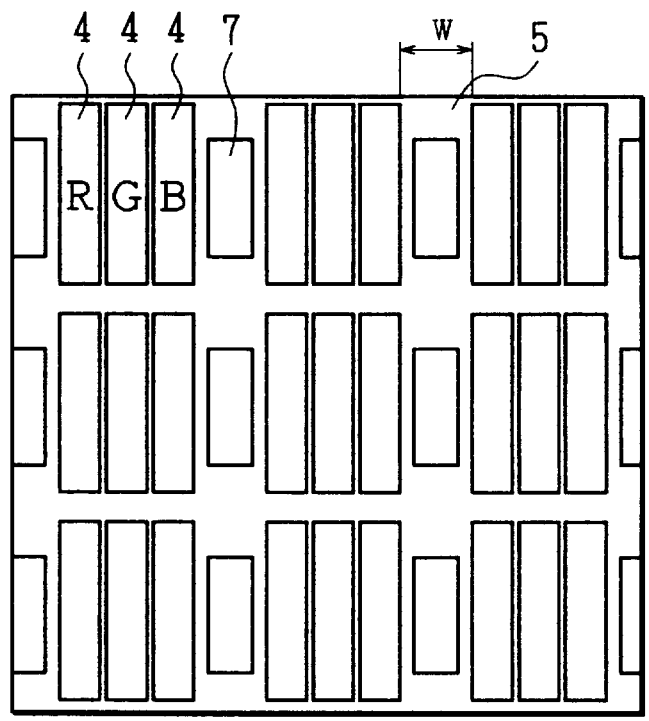
FIG. 12(a) and FIG. 12(b) are plan views showing one example of how spacers of the liquid crystal display device of Third Embodiment are patterned.
Figure 12:
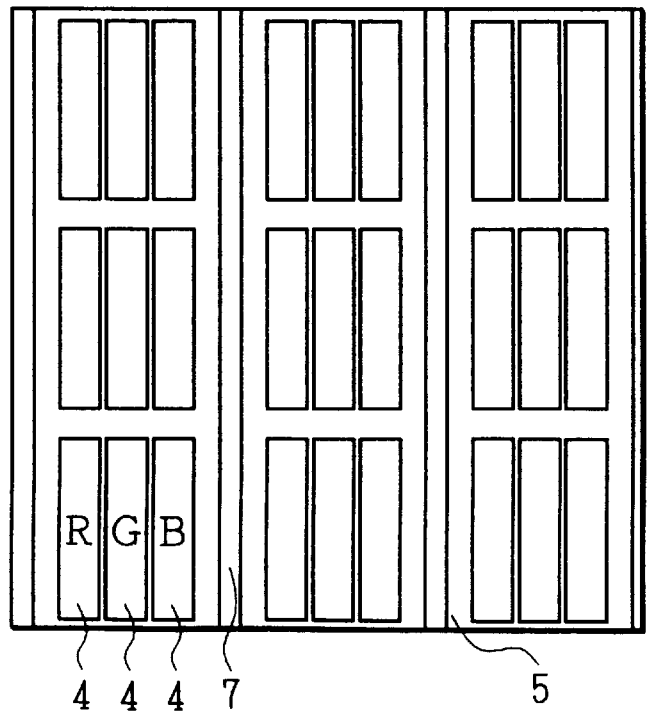

The following will describe Third Embodiment of the present invention referring to FIG. 10 through FIG. 12. FIG. 10 is a plan view of a liquid crystal display device in accordance with the present Embodiment. FIG. 11 is a cross sectional view of the liquid crystal display device of FIG. 10 taken along a line B–B'.

The liquid crystal display device of the present embodiment has a structure wherein one of a pair of substrates, the CF substrate 1 provided with the color filter 4 and the TFT substrate 2 provided with TFTs as an active element, constituting the liquid crystal display device of active-matrix type, namely, the TFT substrate 2 is composed of two small TFT substrates 2a and 2b which are connected to each other.

In general, manufacturing of TFT substrate 2 requires fine working processing of a semiconductor film, and as the substrate size is increased, the yield decreases abruptly. Therefore, the method in which a large substrate is realized by connecting two substrates 2a and 2b, each having half the size of the target size, is extremely effective means in reducing the cost.

The TFT substrates 2a and 2b are each provided with a TFT element formed by a semiconductor film working process, an insulating film, matrix electrodes, pixel electrodes, etc, (all not shown). On the CF substrate 1 are provided the color filter 4 of R, G, and B, the BM 5, and common electrodes (not shown), etc.

On at least one of the TFT substrates 2a and 2b and the CF substrate 1, the alignment film 6 and the spacers 7 are formed with the material and in the steps described in First or Second Embodiment. The two TFT substrates 2a and 2b are connected to each other on the sides by an adhesive 10, the connection being made precisely so that the connected portion is within the region of the BM 5. This realizes the same pixel pitch at the connected portion of the TFT substrates 2a and 2b and the other portions, thus realizing natural displaying without a seam.

Note that, the other structure is the same as that of a common liquid crystal display device of active-matrix type, and since details of such a common liquid crystal display device are described in *Liquid Crystal Device Handbook* (published by The Nikkan Kogyo Shimbun Ltd.), *Liquid Crystal Display Technology* (published by Sangyo Tosho Ltd.), and other publications, explanations thereof are omitted here.

FIG. 12(*a*) and FIG. 12(*b*) are drawings showing one example of how the spacers 7 of the liquid crystal display device are patterned. The spacers 7 are formed in the form of islands or in stripes within the region of the BM 5. In the liquid crystal display device of the present embodiment, in order to cover the connected portion of the two TFT substrates 2a and 2b by the BM 5, the width W of the BM 5 is widened intentionally, and it is preferable to place the spacers 7 on the BM 5 having a wide width.

As described, the described liquid crystal display device has a structure which is advantageous in realizing a larger screen. Thus, by forming the alignment film 6 and the spacers 7 with the material and in the steps described in First or Second Embodiment, it is possible to improve with ease the nonuniformity of the liquid crystal cell gap, which had been a problem particularly in realizing a larger screen.

Also, since the spacers 7 are fixed to at least one of the substrates, the spacers 7 are not moved by the effect of external pressure. Further, as a process of the alignment film material 6a for aligning the liquid crystal molecules, aligning process by irradiation of light is carried out instead of the process by the conventional rubbing method. Because the aligning process by irradiation of light allows the aligning process to be carried out without contacting the alignment film material 6a, the aligning process can be carried out with ease even on a substrate formed with the spacers 7 and thus having a bumpy surface. Therefore, unlike the conventional rubbing method, alignment nonuniformity originating from the spacers 7 is not generated.

Also, as described above, since the spacer material 7a can be patterned before aligning process, unlike the conventional example, the alignment film 6 after aligning process is not contaminated by a solvent, etc., and therefore the liquid crystal aligning ability is not lowered.

Incidentally, when combining the TFT substrates 2a and 2b and the CF substrate 1 provided with spacers, it is a common method to combine the two substrates with the seal 9 provided so as to surround the periphery of each of the TFT substrates 2a and 2b, and then inject the liquid crystal between the two substrates. Generally, as the seal 9, thermosetting epoxy adhesive or light curable acryl adhesive is used, and such an adhesive is patterned by the screen printing method or dispenser drawing method so as to surround the periphery of the TFT substrate 2.

However, because the seal 9 to be positioned on the connecting sides of the TFT substrates 2a and 2b is required to be placed within the width W of the BM 5, in light of the precision required, it is extremely difficult to form the seal 9 by the screen printing method (positioning accuracy of 100 $\mu$m) and dispenser drawing method (positioning accuracy of substantially 50 $\mu$m).

However, when the spacers 7 having adhesion to both the TFT substrates 2a and 2b and the CF substrate 1 are adopted, the spacers 7 function as the seal 9. As a result, the conventionally required step of forming the seal pattern can be omitted, and it is possible to precisely form the seal 9 (that is, spacers 7) on the connecting sides of the TFT substrates 2a and 2b within the region of the BM 5 by photolithography (positioning accuracy of <5 $\mu$m).

Fourth Embodiment

Figure 13:
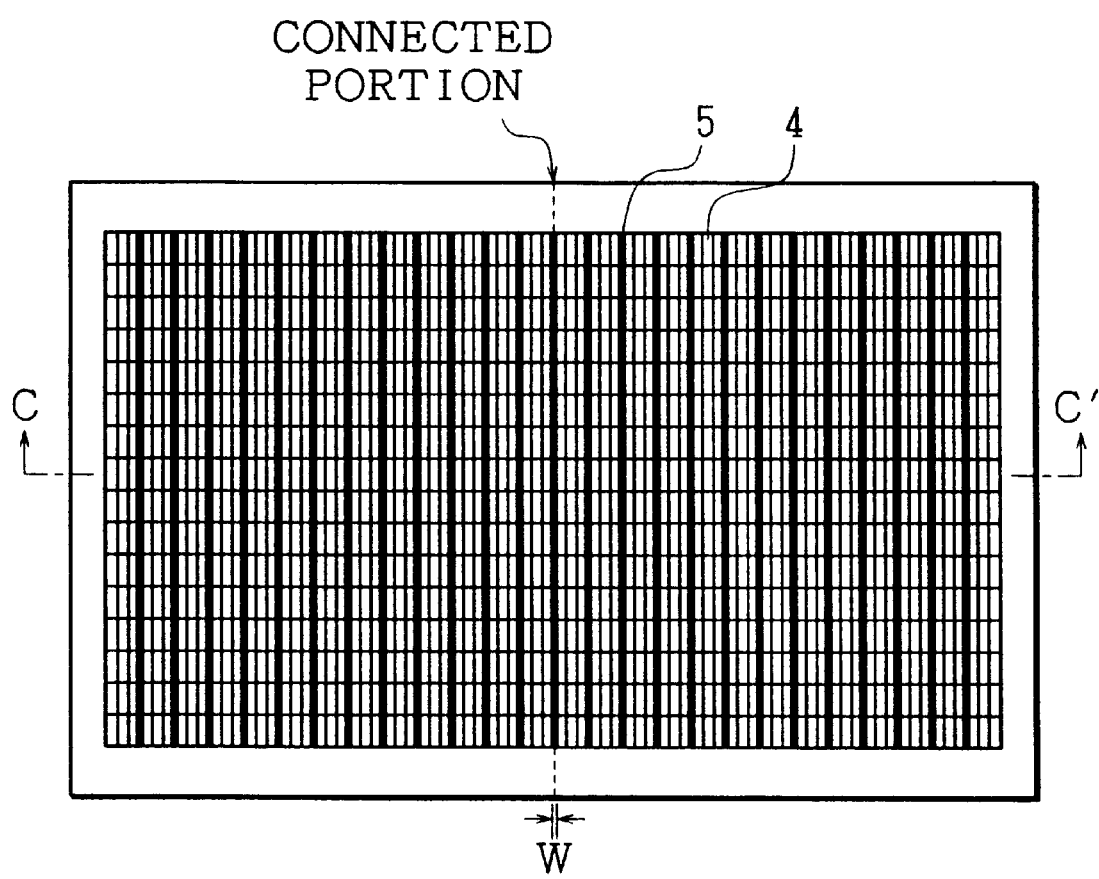
FIG. 13 is a plan view of a liquid crystal display device in accordance with Fourth Embodiment of the present invention.
Figure 14:
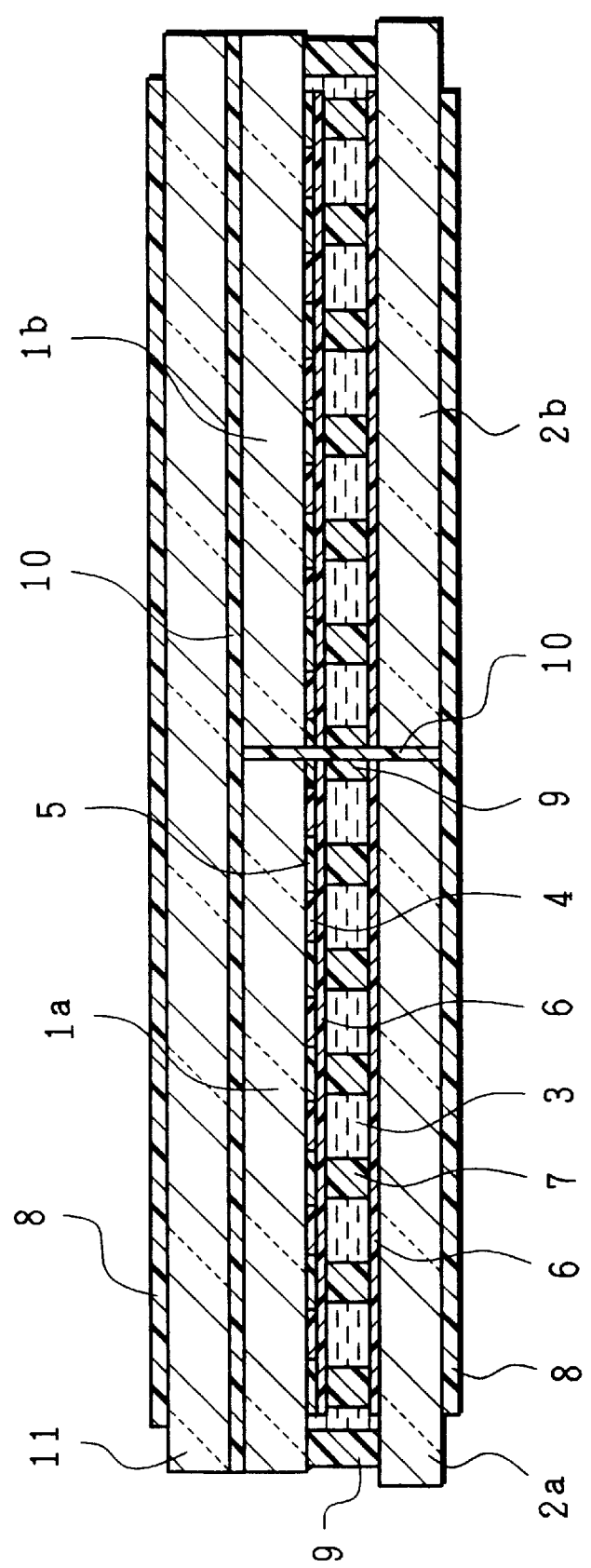
FIG. 14 is a cross sectional view of the liquid crystal display device of FIG. 13 taken along a line C–C'.

The following will describe Fourth Embodiment of the present invention referring to FIG. 13 and FIG. 14. FIG. 13 is a plan view of a liquid crystal display device of the present embodiment. FIG. 14 is a cross sectional view of the liquid crystal display device of FIG. 13 taken along a line C–C'. The liquid crystal display device of the present embodiment has a structure wherein two liquid crystal display panels constituting the liquid crystal display device of active-matrix type are connected adjacent to each other on the same plane.

Liquid crystal panels 21 and 22 are both a liquid crystal panel of active-matrix type having a structure wherein the liquid crystal 3 is enclosed in a spacing between a pair of substrates, namely, between (A) CF substrates 1a and 1b provided with the color filter 4 and (B) TFT substrates 2a and 2b provided with TFTs as an active element, and the pair of substrates are combined with each other by the seal 9.

On the CF substrates 1a and 1b, there are provided the color filter 4 of R, G, and B, the BM 5, and common electrodes (not shown), etc. Also, on at least one of the pair of substrates (TFT substrates 2a and 2b, and CF substrates 1a and 1b), the alignment film 6 and the spacers 7 are formed with the material and in the steps described in First or Second Embodiment.

Note that, the other structure is the same as that of a common liquid crystal display device of active-matrix type, and since details of such a common liquid crystal display device are described in *Liquid Crystal Device Handbook* (published by The Nikkan Kogyo Shimbun Ltd.), *Liquid Crystal Display Technology* (published by Sangyo Tosho Ltd.), and other publications, explanations thereof are omitted here. The two liquid crystal panels having the described structure are combined with a reinforcing substrate 11 by the adhesive 10, thus completing the liquid crystal display device.

In the liquid crystal display device having the above structure, in order to match the connected portion of the two liquid crystal panels 21 and 22 with the width of the BM 5, the width W of the BM 5 is widened intentionally, and it is preferable to position the spacers 7 within the region of the BM 5 having a wide width. As in Third Embodiment and as shown in FIG. 12(*a*) and FIG. 12(*b*), the spacers 7 are formed in the form of islands or in stripes within the region of the BM 5.

As described, the described liquid crystal display device has a structure which is advantageous in realizing a larger screen. Thus, by forming the alignment film 6 and the spacers 7 with the material and in the steps described in First or Second Embodiment, it is possible to improve with ease the nonuniformity of the liquid crystal cell gap, which had been a problem in realizing a larger screen. Also, since spacers 7 are fixed to at least one of the substrates, the spacers 7 are not moved by the effect of external pressure.

Further, as a process of the alignment film material 6a for aligning the liquid crystal molecules, instead of the process by the conventional rubbing method, aligning process by irradiation of light is carried out. Because the aligning process by irradiation of light allows the aligning process to be carried out without contacting the alignment film material 6a, it is possible to carry out the aligning process with ease even on a substrate formed with the spacers 7 and thus having a bumpy surface. Therefore, unlike the conventional rubbing method, alignment nonuniformity originating from the spacers 7 is not generated. Also, as described above, since the spacer material 7a can be patterned before aligning process, unlike the conventional example, the alignment film 6 after aligning process is not contaminated by a solvent, etc., and therefore the liquid crystal aligning ability is not lowered.

Incidentally, when combining the TFT substrates 2a and 2b and the CF substrates 1a and 1b constituting the liquid crystal panels, it is a common practice to combine the two substrates by the seal 9 so as to surround the periphery of each liquid crystal panel, and a liquid crystal is injected between the two substrates. Generally, as the seal 9, thermosetting epoxy adhesive or light curable acryl adhesive is adopted, and such an adhesive is patterned by the screen printing method or dispenser drawing method so as to surround the periphery of the TFTs.

However, because the seal 9 to be positioned on the connecting sides of the TFT substrates 2a and 2b is required to be placed within the width W of the BM 5, in light of the precision required, it is extremely difficult to form the seal 9 by the screen printing method (positioning accuracy of 100 μm) and dispenser drawing method (positioning accuracy of substantially 50 μm).

However, when the spacers 7 having adhesion to both the TFT substrates 2a and 2b and the CF substrates 1a and 1b are adopted, the spacers 7 function as the seal 9. As a result, the conventionally required step of forming the seal pattern can be omitted, and it is possible to precisely form the seal 9 (that is, spacers 7) on the connecting sides of the TFT substrates 2a and 2b within the region of the BM 5 by photolithography (positioning accuracy of <5 μm).

In First through Fourth Embodiment, the explanations were given based on the liquid crystal display device of active-matrix type adopting a TFT element. However, the present invention is also applicable to other liquid crystal display devices of active-matrix type adopting MIM element or plasma address element, or to a liquid crystal display device of simple-matrix type. The present invention is especially effective in liquid crystal display devices having a screen of 20 inches or larger measured diagonally, which require a uniform cell gap.

The liquid crystal display device of the present invention may have an arrangement wherein a liquid crystal is sandwitched between a pair of electrode substrates facing each other, and there are provided spacers fixed to predetermined positions on one of the pair of electrode substrates, and an alignment film subjected to aligning process by irradiation of light.

This arrangement allows the spacers to be provided on predetermined positions with predetermined density, thus realizing a uniform liquid crystal cell gap when the liquid crystal is injected. Also, since the spacers are fixed to at least one of the substrates, the spacers are not moved by the effect of external pressure.

Further, as a process of the alignment film for aligning the liquid crystal molecules, aligning process by irradiation of light is carried out instead of the conventional rubbing method. Because the aligning process by irradiation of light allows the aligning process to be carried out without contacting the alignment film, the aligning process can be carried out with ease even on a substrate formed with the spacers and thus having a bumpy surface. As a result, unlike the conventional rubbing method, alignment nonuniformity originating from the spacers is not generated.

Furthermore, as described above, since the spacer material can be patterned before aligning process, unlike the conventional example, the alignment film after aligning process is not contaminated by a solvent, etc., and therefore the liquid crystal aligning ability is not lowered.

The liquid crystal display device of the present invention may have an arrangement wherein a pair of substrates (CF substrate 1 and TFT substrate 2) are composed of a single large electrode substrate (CF substrate 1) and a plurality of small electrode substrates (TFT substrates 2a and 2b).

This arrangement realizes a large substrate by a connection of small and inexpensive substrates, and therefore has an advantage in costs in realizing a liquid crystal display device having a large screen.

The liquid crystal display device of the present invention may have an arrangement wherein a pair of electrode substrates (CF substrates 1a and 1b and TFT substrates 2a and 2b) facing each other are provided in plurality and are connected adjacent to one another so that the display surfaces of the plural pairs of substrates are substantially on the same plane. This arrangement realizes a liquid crystal display device by a connection of small and inexpensive liquid crystal panels, and therefore has an advantage in cost in realizing a liquid crystal display device having a large screen.

The liquid crystal display device of the present invention may have an arrangement wherein the alignment film material is a photo-crosslinkable organic film (polyvinyl cinnamate film) whose high polymer side chains parallel to the polarization plane are selectively crosslinked by irradiation of linearly polarized light. With this arrangement, the alignment anchoring force is exhibited with ease by irradiation of light.

The liquid crystal display device of the present invention may have an arrangement wherein the alignment film material is a material, such as polyimide, whose high polymer main chain parallel to the polarization plane undergoes anisotropic photolysis by irradiation of linearly polarized light. With this arrangement, the alignment anchoring force is exhibited with ease by irradiation of light.

The liquid crystal display device of the present invention may have an arrangement wherein the spacers are provided on a black matrix region (BM 5 region) which is a light non-transmissive region. With this arrangement, since the spacers are provided on the light non-transmissive black matrix region, the spacers are not noticeable. Namely, the transmittance of light at the light transmissive region is not lowered by the provision of the spacers.

The liquid crystal display device of the present invention may have an arrangement wherein the spacers have adhesion to the pair of electrode substrates.

With this arrangement, since the spacers are bonded and fixed to the substrates, a uniform cell gap is realized. Also, the spacers are not moved by the effect of external pressure, and waviness on the liquid crystal panel, which is caused by nonuniform cell gap, is not generated.

The liquid crystal display device of the present invention may have an arrangement wherein the spacers are provided as a seal on the periphery of each of the pair of substrates.

With this arrangement, the spacers function also as a seal, and the step of forming the seal pattern is omitted, thus simplifying the manufacturing process.

The manufacturing method of a liquid crystal display device of the present invention may include the steps of applying an alignment film to each of a pair of electrode substrates, applying a spacer material on at least one of the pair of electrode substrates, patterning the spacer material, and subjecting the substrate on which the spacer material has been patterned to aligning process by photo-aligning method.

This method prevents the alignment film after aligning process from being contaminated by a solvent, etc., and unlike the conventional example, the liquid crystal aligning ability is not lowered.

The manufacturing method of a liquid crystal display device of the present invention may be a method in which the spacer material and the alignment film material are photosensitive, and the sensitivity wavelength $\lambda 1$ of the spacer material and the sensitivity wavelength $\lambda 2$ of the alignment film material satisfy the relationship of $\lambda 1 \neq \lambda 2$.

This reduces the probability of the irradiation light for patterning the spacer material on the upper layer adversely affecting the alignment film material on the under layer.

The manufacturing method of a liquid crystal display device of the present invention may be a method in which the spacer material and the alignment film material are photosensitive, and the exposure amount P1 required for patterning of the spacer material and the exposure amount P2 required for aligning process of the alignment film material satisfy the relationship of P1<P2.

This reduces the probability of the irradiation light for patterning the spacer material on the upper layer adversely affecting the alignment film material on the under layer.

The manufacturing method of a liquid crystal display device of the present invention may include the steps of applying the spacer material on at least one of the electrode substrates, patterning the spacer material, applying the alignment film material on the pair of electrode substrates, and carrying out aligning process by photo-aligning method.

This method prevents the alignment film material after aligning process from being contaminated by a solvent, etc., and unlike the conventional example, the liquid crystal aligning ability is not lowered.

The manufacturing method of a liquid crystal display device of the present invention may be a method in which the step of applying the alignment film material is carried out by the spraying method which applies a solution of alignment film material.

With this method, the alignment film material is uniformly applied even on a substrate surface on which spacers having a height of several microns are fixed.

Note that, the spacers may be provided in the form of cylinders. This prevents nonuniform irradiation of light on the surface of the alignment film material, especially around the spacers, in the photo-aligning process. Namely, when the spacers are cylinders, compared with the case of prisms, the spacers cast less shadows, and as a result the portion on the alignment film material, which is not irradiated by light, is less.

Alternatively, the cylindrical spacers may have a shape of, for example, a Corinth pillar, in which the circumference in the vicinity of the tip of the cylinder is smaller than the circumference at the central portion. This further reduces the shadows of the spacers when irradiating light compared with the case where the simple cylindrical spacers are adopted.

Also, when the spacers are provided in stripes, the irradiation direction of light may be made parallel to the lengthwise direction of the stripes. This further reduces the shadows of the spacers provided in stripes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device, comprising:
   a liquid crystal;
   a pair of substrates facing each other so that said liquid crystal is sandwiched therebetween and an electric field for displaying is applied to said liquid crystal;
   spacers fixably provided between said pair of substrates; and
   an alignment film material provided on at least one of said pair of substrates so as to contact said liquid crystal, said alignment film material showing aligning property upon irradiation of light;
   said spacers being provided on said alignment film material, and
   said alignment film material being given alignment after said spacers are formed.

2. The liquid crystal display device as set forth in claim 1, wherein said pair of substrates include a first substrate provided with a color filter for color displaying and a second substrate provided with thin film transistors as an active element for driving said liquid crystal.

3. The liquid crystal display device as set forth in claim 1, wherein said pair of substrates are composed of a large substrate and a plurality of small substrates, facing each other.

4. The liquid crystal display device as set forth in claim 2, wherein the second substrate is composed of a plurality of small substrates which are connected to one another.

5. The liquid crystal display device as set forth in claim 1, wherein each of said pair of substrates is composed of a plurality of small substrates which are connected to one another so that display surfaces of the plurality of small substrates are on a same plane.

6. The liquid crystal display device as set forth in claim 1, wherein said alignment film material is a photo-crosslinkable organic film whose high polymer side chains parallel to a polarization plane are selectively crosslinked to one another by irradiation of linearly polarized light.

7. The liquid crystal display device as set forth in claim 6, wherein the photo-crosslinkable organic film is a polyvinyl cinnamate film.

8. The liquid crystal display device as set forth in claim 1, wherein said alignment film material is polyimide whose high polymer main chain parallel to a polarization plane undergoes anisotropic photolysis by irradiation of linearly polarized light.

9. The liquid crystal display device as set forth in claim 1, wherein said spacers are provided so as to face a black matrix region which is a light non-transmissive region.

10. The liquid crystal display device as set forth in claim 9, wherein said spacers are provided in a form of islands or in stripes.

11. The liquid crystal display device as set forth in claim 1, wherein said spacers are formed by photolithography.

12. The liquid crystal display device as set forth in claim 1, wherein said spacers have adhesion for said pair of substrates.

13. The liquid crystal display device as set forth in claim 12, wherein said spacers are provided also as a seal for said liquid crystal on a periphery of each of said pair of substrates.

14. A method for manufacturing a liquid crystal display device, comprising the steps of:
(1) applying an alignment film material on at least one of a pair of substrates for sandwiching liquid crystal;
(2), subsequent to the first step, applying a spacer material on at least one of the pair of substrates;
(3), subsequent to the second step, patterning the spacer material; and
(4), subsequent to the third step, subjecting the alignment film material applied to an aligning process by photo-aligning method.

15. The method as set forth in claim 14, wherein:
the spacer material and the alignment film material are photosensitive, and
a sensitivity wavelength $\lambda 1$ of the spacer material and a sensitivity wavelength $\lambda 2$ of the alignment film material satisfy a relationship of $\lambda 1 \neq \lambda 2$.

16. The method as set forth in claim 14, wherein:
the spacer material and the alignment film material are photosensitive, and
an exposure amount P1 required for the patterning of the spacer material and an exposure amount P2 required for the aligning process of the alignment film material satisfy a relationship of P1<P2.

17. The method as set forth in claim 14, wherein the photo-aligning method sets an incident angle of linearly polarized ultraviolet light in a range of 70° to 80° with respect to a normal direction to surfaces of the pair of substrates.

18. A method for manufacturing a liquid crystal display device, comprising the steps of:
applying a spacer material on at least one of the pair of substrates;
patterning the spacer material;
applying an alignment film material on at least one of a pair of substrates for sandwiching liquid crystal; and
subjecting the alignment film material applied to an aligning process by photo-aligning method,
wherein said step of applying an alignment film material is carried out by a spraying method which applies a solution of alignment film material.

* * * * *